(12) United States Patent
Gurnov et al.

(10) Patent No.: US 12,047,401 B2
(45) Date of Patent: *Jul. 23, 2024

(54) SYSTEMS AND METHODS FOR MACHINE LEARNING-BASED DETECTION OF AN AUTOMATED FRAUD ATTACK OR AN AUTOMATED ABUSE ATTACK

(71) Applicant: Sift Science, Inc., San Francisco, CA (US)

(72) Inventors: Kostyantyn Gurnov, San Francisco, CA (US); Wei Liu, San Francisco, CA (US); Nicholas Benavides, San Francisco, CA (US); Volha Leusha, San Francisco, CA (US); Yanqing Bao, San Francisco, CA (US); Louie Zhang, San Francisco, CA (US); Irving Chen, San Francisco, CA (US); Logan Davis, San Francisco, CA (US); Andy Cai, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,171

(22) Filed: Sep. 12, 2023

(65) Prior Publication Data

US 2023/0421584 A1 Dec. 28, 2023

Related U.S. Application Data

(63) Continuation of application No. 18/083,562, filed on Dec. 18, 2022, now Pat. No. 11,777,962.

(Continued)

(51) Int. Cl.
*H04L 9/40* (2022.01)
*G06N 20/20* (2019.01)

(52) U.S. Cl.
CPC ......... *H04L 63/1416* (2013.01); *G06N 20/20* (2019.01); *H04L 63/1425* (2013.01)

(58) Field of Classification Search
CPC .. H04L 63/1416; H04L 63/1425; G06N 20/20
(Continued)

(56) References Cited

U.S. PATENT DOCUMENTS 10,893,058 B1 * 1/2021 Casaburi .............. G06F 21/566
2018/0338010 A1 * 11/2018 Llanos Alonso ....... G06F 21/56
(Continued)

*Primary Examiner* — Badri Narayanan Champakesan
(74) *Attorney, Agent, or Firm* — Padowithz Alce; Alce PLLC

(57) ABSTRACT

A method for machine learning-based detection of an automated fraud or abuse attack includes: identifying, via a computer network, a digital event associated with a suspected automated fraud or abuse attack; composing, via one or more computers, a digital activity signature of the suspected automated fraud or abuse attack based on digital activity associated with the suspected automated fraud or abuse attack; computing, via a machine learning model, an encoded representation of the digital activity signature; searching, via the one or more computers, an automated fraud or abuse signature registry based on the encoded representation of the digital activity signature; determining a likely origin of the digital event based on the searching of the automated fraud or abuse signature registry; and selectively implementing one or more automated threat mitigation actions based on the likely origin of the digital event.

19 Claims, 7 Drawing Sheets

Related U.S. Application Data

(60) Provisional application No. 63/316,703, filed on Mar. 4, 2022, provisional application No. 63/291,336, filed on Dec. 17, 2021.

(58) Field of Classification Search
USPC .......................................................... 726/23
See application file for complete search history.

(56) References Cited

U.S. PATENT DOCUMENTS

| | | | |
|---|---|---|---|
| 2020/0285737 A1* | 9/2020 | Kraus | G06F 21/552 |
| 2022/0180368 A1* | 6/2022 | Immaneni | G06Q 20/4014 |

* cited by examiner

SYSTEMS AND METHODS FOR MACHINE LEARNING-BASED DETECTION OF AN AUTOMATED FRAUD ATTACK OR AN AUTOMATED ABUSE ATTACK

CROSS-REFERENCE TO RELATED APPLICATIONS

This application is a continuation of U.S. patent application Ser. No. 18/083,562, filed on 18 Dec. 2022, which claims the benefit of U.S. Provisional Application No. 63/291,336, filed on 17 Dec. 2021, and U.S. Provisional Application No. 63/316,703, filed on 4 Mar. 2022, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In some embodiments, a method for machine learning-based detection of an automated includes: identifying, via one or more computers, a digital event associated with a suspected automated fraud or abuse attack; deriving a corpus of feature data based on data associated with the digital event; composing, via the one or more computers, a digital activity signature of the suspected automated fraud or abuse attack based at least on the corpus of feature data, wherein the digital activity signature comprises a graphical, time-based representation of digital activity associated with the suspected automated fraud or abuse attack; computing, via one or more machine learning models, an encoded representation of the digital activity signature based on providing the digital activity signature, as input, to the one or more machine learning models; searching, via the one or more computers, an automated fraud or abuse signature registry based on the encoded representation of the digital activity signature, wherein searching the automated fraud or abuse signature registry includes searching for labeled digital fraud or abuse clusters that are within a threshold distance of the encoded representation of the digital activity signature; determining whether the digital event is associated with an automated fraud attack or an automated abuse attack based on the searching of the automated fraud or abuse signature registry; and selectively implementing one or more automated threat mitigation actions if the digital event is determined to be associated with the automated fraud attack or the automated abuse attack.

In some embodiments, the graphical, time-based representation includes a digital activity sequence graph, each distinct location of the digital activity sequence graph corresponds to a target digital event associated with the suspected automated fraud or abuse attack and a subject digital event feature, and each distinct location on the digital activity sequence graph visually indicates a value of the subject digital event feature for the target digital event.

In some embodiments, the digital activity sequence graph includes a first axis and a second axis, each distinct position along the first axis relates to a distinct digital event associated with the suspected automated fraud or abuse attack, each distinct position along the second axis relates to a distinct digital event feature, and a position of a subject digital event on the first axis is based on a chronological order of the digital activity associated with the suspected automated fraud or abuse attack.

In some embodiments, the automated fraud or abuse signature registry includes a plurality of distinct digital fraud or abuse clusters, each of the plurality of distinct digital fraud or abuse clusters relates to a distinct type of fraud or abuse, and each of the plurality of distinct digital fraud or abuse clusters includes encoded representations of digital activity signatures associated with the distinct type of fraud or abuse.

In some embodiments, determining whether the digital event is associated with the automated fraud attack or the automated abuse attack includes: determining that the digital event is not associated with the automated fraud attack or the automated abuse attack if the searching determines that zero labeled digital fraud or abuse clusters are within the threshold distance of the encoded representation of the digital activity signature; and determining that the digital event is associated with the automated fraud attack or the automated abuse attack if the searching determines that at least one labeled digital fraud or abuse cluster is within the threshold distance of the encoded representation of the digital activity signature.

In some embodiments, the method includes computing a centroid for each of the plurality of distinct digital fraud or abuse clusters. In some embodiments, searching for labeled digital fraud or abuse clusters that are within the threshold distance of the encoded representation of the digital activity signature includes: calculating a distance between the encoded representation of the digital activity signature and the centroid of each of the plurality of distinct digital fraud or abuse clusters; and identifying digital fraud or abuse clusters whose centroid is within the threshold distance of the encoded representation of the digital activity signature.

In some embodiments, the digital event is occurring at a web-enabled service of a subscriber, the digital event is determined to be associated with the automated fraud attack or the automated abuse attack, and implementing the one or more automated threat mitigation actions includes: generating a threat mitigation action that prevents the web-enabled service from processing the digital event to completion.

In some embodiments, the digital event is occurring at a web-enabled service of a subscriber, the digital event is determined not to be associated with the automated fraud attack or the automated abuse attack, and implementing the one or more automated threat mitigation actions includes: generating a threat mitigation action that allows the web-enabled service to process the digital event to completion.

In some embodiments, the method includes constructing the automated fraud or abuse signature registry. In some embodiments, constructing the automated fraud or abuse signature registry includes: composing a plurality of distinct digital activity signatures for a plurality of distinct automated fraud or abuse attacks; computing, via the one or more machine learning models, an encoded representation of the plurality of distinct digital activity signatures; implementing one or more unsupervised machine learning models that are configured to: receive model input comprising the plurality of distinct digital activity signatures, and predict a plurality of distinct clusters of digital activity signatures based on the model input; assessing the plurality of distinct clusters of digital activity signatures; and associating metadata with each of the plurality of distinct clusters based on the assessing, wherein associating metadata with a target cluster of digital activity signatures includes attributing an automated fraud or abuse attack label to the target cluster.

In some embodiments, the method includes implementing an automated fraud or abuse detection workflow based on identifying the digital event. In some embodiments, the automated fraud or abuse detection workflow includes a plurality of digital threat mitigation routes, including: at least one digital threat mitigation route directed to handing the digital event as a suspected low-throughput, low-volume automated fraud or abuse attack; at least one digital threat mitigation route directed to handling the digital event as a high-throughput, high-volume automated fraud or abuse attack; and at least one digital threat mitigation route directed to handing the digital event as genuine digital activity, and a digital threat mitigation route directed to processing the digital event as the suspected low-throughput, low-volume automated fraud or abuse attack is configured to perform a plurality of automated threat mitigation actions including: the deriving the corpus of feature data; the composing the digital activity signature of the suspected automated fraud or abuse attack; the computing the encoded representation of the digital activity signature; the searching the automated fraud or abuse signature registry; the determining whether the digital event is associated with the automated fraud or the automated abuse attack; and the selectively implementing the one or more automated threat mitigation actions.

In some embodiments, a digital threat mitigation route directed to processing the digital event as genuine digital activity is configured to perform a plurality of automated threat mitigation actions including producing a disposal decision that allows a web-enabled service of the subscriber to process the digital event to completion, and a digital threat mitigation route directed to processing the digital event as a high-throughput, high-volume automated fraud or abuse attack is configured to perform a plurality of automated threat mitigation actions including producing a disposal decision that prevents the web-enabled service of the subscriber from processing the digital event to completion.

In some embodiments, deriving the corpus of feature data includes: identifying, via the one or more computers, a digital event data corpus corresponding to the digital event, wherein the digital event data corpus comprises properties or attributes of the digital event, computing a plurality of distinct velocity-informative features for at least a subset of the properties or attributes of the digital event, wherein a velocity-informative feature computed for a subject property or attribute of the digital event relates to a total number of times the subject property or attribute occurred in digital events detected during a target time span, and computing a plurality of distinct count-informative features for at least a subset of the properties or attributes of the digital event, wherein a count-informative feature computed for a subject property or attribute of the digital event relates to a total number of times the subject property or attribute was detected in other digital events detected by a digital threat mitigation service.

In some embodiments, executing a target digital threat mitigation route defined in the automated fraud or abuse detection workflow. In some embodiments, the target digital threat mitigation route is executed based on identifying that the plurality of distinct velocity-informative features and the plurality of distinct count-informative features satisfy route criteria of the target digital threat mitigation route.

In some embodiments, a method for machine learning-based detection of an automated fraud or abuse attack includes: identifying, via a computer network, a digital event associated with a suspected automated fraud or abuse attack; composing, via one or more computers, a digital activity signature of the suspected automated fraud or abuse attack based on digital activity associated with the suspected automated fraud or abuse attack; computing, via a machine learning model, an encoded representation of the digital activity signature; searching, via the one or more computers, an automated fraud or abuse signature registry based on the encoded representation of the digital activity signature; determining a likely origin of the digital event based on the searching of the automated fraud or abuse signature registry; and selectively implementing one or more automated threat mitigation actions based on the likely origin of the digital event.

In some embodiments, determining the likely origin of the digital event includes determining if the digital event likely originated via one of a real digital user, a high-throughput, high-volume automated fraud or abuse attack, and a low-throughput, low-volume automated fraud or abuse attack.

In some embodiments, computing the encoded representation of the digital activity signature includes: implementing an autoencoder machine learning model specifically trained to encode digital activity signatures, and using the autoencoder machine learning model to generate a vector representation of the digital activity signature composed for the suspected automated fraud or abuse attack.

In some embodiments, the method includes constructing the automated fraud or abuse signature registry, wherein constructing the automated fraud or abuse signature registry includes: composing a plurality of distinct digital activity signatures for a plurality of distinct automated fraud or abuse attacks; computing, via the machine learning model, an encoded representation of the plurality of distinct digital activity signatures; implementing an unsupervised machine learning model that is configured to: receive model input comprising the plurality of distinct digital activity signatures, and predict a plurality of distinct clusters of digital activity signatures based on the model input; and attributing an automated fraud or abuse attack label to each of the plurality of distinct clusters of digital activity signatures based on an assessment of the plurality of distinct clusters of digital activity signatures.

In some embodiments, the digital activity signature comprises a graphical representation of the digital activity associated with the suspected automated fraud or abuse attack.

In some embodiments, the digital event comprises one of a digital purchase event, a digital account opening event, and a digital account login event.

In some embodiments, the digital event is occurring at a web-enabled service of a subscriber, and identifying the digital event includes contemporaneously receiving properties or attributes of the digital event via an application programming interface (API).

In some embodiments, a method for machine learning-based detection of an automated fraud attack or an automated abuse attack includes: identifying, via a computer network, a digital event occurring at a web-enabled service of a subscriber; executing an automated fraud or abuse detection engine based on identifying the digital event, wherein executing the automated fraud or abuse detection engine includes: computing, via one or more computers, a plurality of velocity-informative threat features and a plurality of count-informative threat features based on properties of the digital event; determining, via the one or more computers, a likely origin of the digital event based on the plurality of velocity-informative threat features and the plurality of count-informative threat features, wherein determining the likely origin of the digital event includes determining if the digital event originated via one of a real digital user, a high-throughput, high-volume automated fraud or abuse attack, and (iii) a low-throughput, low-volume automated fraud or abuse attack; and performing, via the one or more computers, one or more threat disposal activities based on the likely origin of the digital event.

In some embodiments, a method for machine learning-based detection of an automated fraud attack or an automated abuse attack includes: identifying, via a computer network, a digital event occurring at a web-enabled service of a subscriber; producing, via an automated feature derivation module, a corpus of feature data associated with the digital event, wherein producing the corpus of feature data includes: identifying, via one or more computers, a digital event data corpus corresponding to the digital event, wherein the digital event data corpus comprises properties or attributes of the digital event; computing a plurality of distinct velocity-informative features for at least a subset of the properties or attributes of the digital event, wherein a velocity-informative feature computed for a subject property or attribute of the digital event relates to a total number of times the subject property or attribute occurred in digital events detected during a target time span; and computing a plurality of distinct count-informative features for at least a subset of the properties or attributes of the digital event, wherein a count-informative feature computed for a subject property or attribute of the digital event relates to a total number of times the subject property or attribute occurred in digital events detected by a digital threat mitigation service; implementing an automated fraud detection workflow based on identifying the digital event, wherein the automated fraud detection workflow comprises a plurality of digital threat mitigation routes including: a plurality of digital threat mitigation routes directed to handling the digital event as a suspected low-throughput, low-volume automated fraud or abuse attack; a plurality of digital threat mitigation routes directed to handling the digital event as a high-throughput, high-volume automated fraud or abuse attack; and a plurality of digital threat mitigation routes directed to handling the digital event as genuine digital activity; executing a target digital threat mitigation route of the plurality of digital threat mitigation routes defined in the automated fraud detection workflow, wherein: the target digital threat mitigation route is executed based on determining that the plurality of distinct velocity-informative features and the plurality of distinct count-informative features satisfy route criteria of the target digital threat mitigation route; executing a digital threat mitigation route directed to handling the digital event as genuine digital activity includes producing a disposal decision that allows the web-enabled service of the subscriber to process the digital event to completion; executing a digital threat mitigation route directed to handling the digital event as a high-throughput, high-volume automated fraud or abuse attack includes producing a disposal decision that prevents the web-enabled service of the subscriber to from processing the digital event to completion; and executing a digital threat mitigation route directed to handling the digital event as a suspected low-throughput, low-volume automated fraud or abuse attack includes: constructing a digital event activity sequence for the suspected low-throughput, low-volume automated fraud or abuse attack, wherein the digital event activity sequence comprises a chronological ordering of digital activity preceding and succeeding the digital event; computing an embedding signature of the digital event activity sequence based on providing the digital event activity sequence as input to an embeddings model; querying an automated fraud or abuse signature registry based on the embedding signature of the digital event activity sequence, wherein: the automated fraud or abuse signature registry comprises a plurality of labeled fraud or abuse clusters, wherein: each labeled fraud or abuse cluster relates to a distinct type of fraud or abuse; and each labeled fraud or abuse cluster relates includes a plurality of embedding signatures of digital event activity sequences relating to the distinct type of fraud or abuse; and querying the automated fraud or abuse signature registry includes identifying labeled fraud or abuse clusters that are within a threshold distance of the embedding signature of the digital event activity sequence; and producing a disposal decision based on results returned from querying the automated fraud or abuse signature registry, wherein: the disposal decision prevents the web-enabled service of the subscriber from processing the digital event to completion based on determining that zero labeled fraud or abuse clusters are within the threshold distance of the embedding signature of the digital event activity sequence; and the disposal decision allows the web-enabled service of the subscriber to process the digital event to completion based on determining that at least one labeled fraud or abuse clusters is within a threshold distance of the embedding signature of the digital event activity sequence.

DESCRIPTION OF THE PREFERRED EMBODIMENTS

Figure 1:
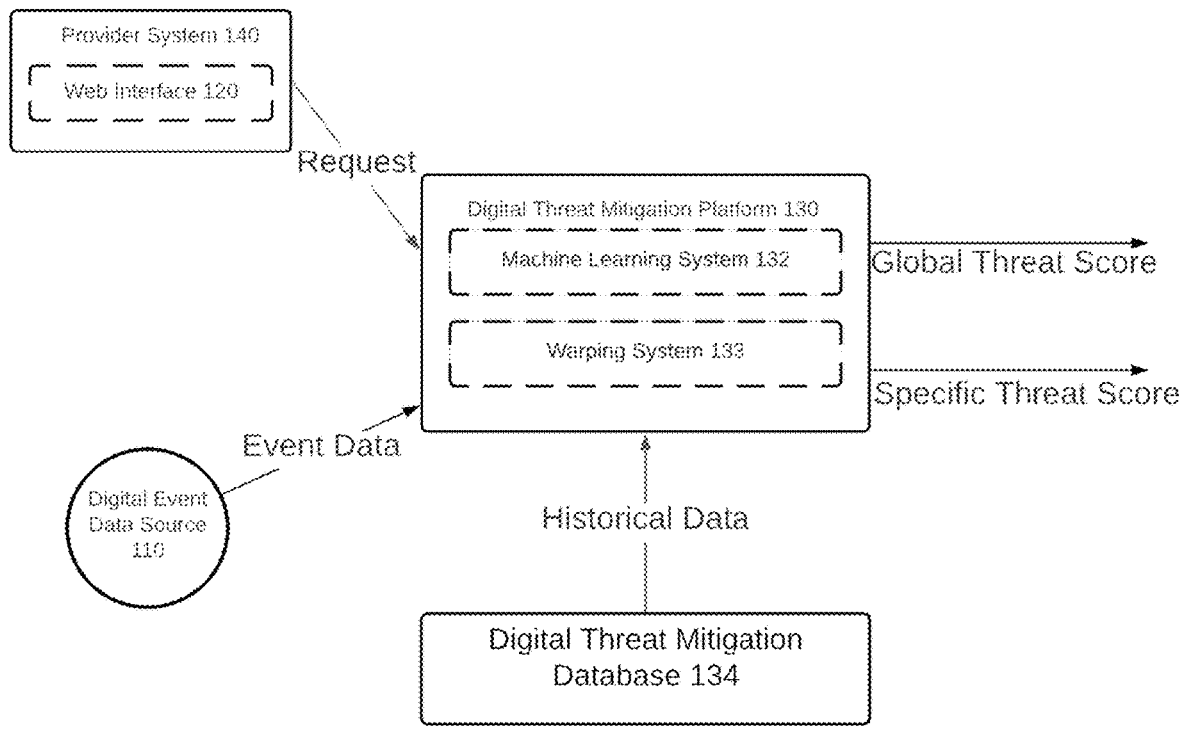
FIG. 1 illustrates a schematic representation of an exemplary system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954, 879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, and/or the like). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current digital events to mitigate or eliminate a digital threat associated therewith. Additionally, or alternatively, in one or more embodiments, digital event data processing decisions may be automated via automated decisioning workflows, as described in U.S. Pat. No. 9,954, 879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, and/or the like) of the service providers. The digital events data and digital activities data collected by the one or more digital event data sources 110 may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, and/or the like) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, a linear discriminate analysis, and/or the like), a clustering method (e.g., k-means clustering, density-based spatial clustering of applications with noise (DBSCAN), expectation maximization, and/or the like), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial lest squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, and/or the like) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

2. Method for Detecting an Automated Fraud or Abuse Attack

Figure 2:
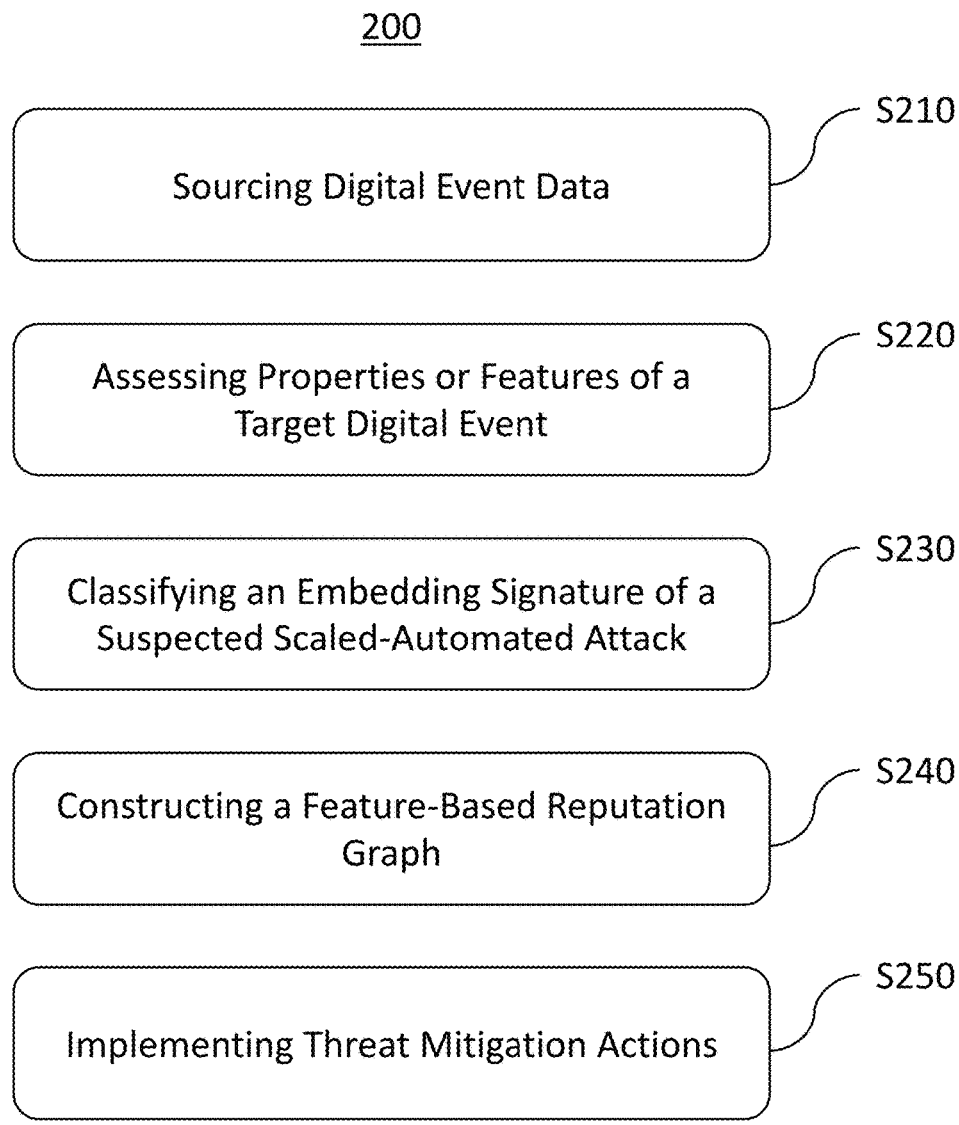
FIG. 2 illustrates an exemplary method in accordance with one or more embodiments of the present application.

As shown in FIG. 2, the method 200 for a machine learning-informed detection of an automated fraud or abuse attack includes sourcing digital event data (S210), assessing one or more properties or features of a target digital event (S220), classifying an embedding signature of a suspected automated attack (S230), constructing a feature-based reputation graph (S240), and implementing threat mitigation actions based on a reputation label computed for a target digital event (S250).

2.10 Event Data Corpus|Feature Extraction

S210, which includes sourcing digital event data, may function to identify digital event data associated with a target digital event that may relate to a suspected automated fraud attack. Additionally, or alternatively, as will be described in more detail herein, S210 may function to construct, via a feature extractor, a feature corpus that may include one or more characteristics/features associated with the target digital event.

In one or more embodiments, the target digital event may correspond or relate to a particular type of online digital activity. For instance, in a non-limiting example, the target digital event may correspond to a digital purchase event, digital account opening event, digital account login event, digital update order event, digital posting or digital publishing event, online communication or online messaging event, or any other type of digital activity or event performed by a digital user. While, in many embodiments, the target digital event may correspond to digital activity or events occurring (e.g., completely) over the web or the Internet, the target digital event may also correspond to events and/or activities that occur or are initiated outside of the web or the Internet (e.g., in a physical environment) in which some part of the event or activity involves the web or the Internet.

Event Data Corpus

In one or more embodiments, S210 may function to receive digital event data corresponding to the target digital event. For instance, in a non-limiting example, a digital resource (e.g., service or system) of a subscriber subscribing to the system or service implementing the method 200 may detect that a digital user may be attempting to perform an online order/transaction (or another type of digital event/activity), and in response, may transmit, to the system or service implementing method 200, digital event data corresponding to the online order/transaction (or the another type of digital event/activity). S210 may also function to receive digital event data relating to other types of digital events occurring at a digital resource of the subscriber, such as digital event data relating to a digital account opening event, digital login attempts, digital user activity events on an online web page, and/or the like. In a preferred embodiment, the system or service implementing method 200 optionally receives the transmitted digital event data via a web interface (e.g., an application programming interface (API)) that is specifically configured to ingest/receive digital events transmitted by the subscriber.

In one or more embodiments, the digital event data ("event data corpus") corresponding to the target digital event may define/include one or more properties, characteristics, and/or attributes of the target digital event. For instance, in a non-limiting example, if the target digital event corresponds to a transaction-based digital event, the corresponding digital event data may include (1) a first property that indicates the digital user (e.g., user identification, user account data, or the like) attempting to perform the transaction-based digital event, (2) a second property that indicates an email address of the digital user attempting to perform the transaction-based digital event, (3) a third property that indicates a shipping address provided by the digital user, (4) a fourth property that indicates information about a credit card provided by the digital user, (5) a fifth property relating to an electronic device (e.g., device identification) involved in performing the transaction-based digital event, (6) a sixth property relating to an IP address of the electronic device when the transaction-based digital event was performed, (7) a seventh property relating to which user session the digital user performed the transaction-based digital event (e.g., user session identification), and/or the like. It shall be noted that digital event data corresponding to other types of digital events may optionally define additional, similar or different digital event properties as compared to the ones described above.

Feature Extraction

In one or more embodiments, after identifying or receiving digital event data corresponding to the target digital event, S210 may function to implement a feature extractor to identify and extract decision-relevant and/or prediction-relevant features of the digital event data. In one or more embodiments, the feature extractor may be specifically configured and/or designed to extract features from digital event data that may be used as model input for generating one or more threat predictions by one or more digital fraud and/or digital abuse scoring machine learning models.

In a first implementation, the feature extractor may function to extract—as features—one or more of the properties defined in the digital event data. For instance, in a non-limiting example, after (e.g., in response) identifying the digital event data corresponding to the target digital event, the feature extractor may function to extract at least the above-described first, second, third, fourth, fifth, sixth, and/or seventh properties defined in the digital event data as a first, second, third, fourth, fifth, sixth, and/or seventh feature, respectively.

In a second implementation, the feature extractor may function to derive one or more features relating to an order or sequence in which the target digital event occurred relative to related digital events ("connected digital events"). For instance, in a non-limiting example, if the target digital event is connected to a first set of other digital events, the feature extractor may derive one or more features indicating a manner in which the target digital event occurred relative to each respective digital event included in the first set of other digital events (e.g., a first feature indicating that the target digital event occurred before a first connected digital event (e.g., a logout digital event), a second feature indicating that the target digital event occurred after a second connected digital event (e.g., a login digital event), a third feature indicating that the target digital event occurred between a third and a fourth connected digital event (e.g., a create order digital event and a check order status digital event, respectively), and/or the like.

In a preferred embodiment, the target digital event may be connected to one or more other digital events if the target digital event and/or the one or more other digital events share a common property or attribute (e.g., originated from a same IP address, occurred during a same user session, purchased by a same credit card, originated via a same electronic device, and/or correspond to a same digital user, and/or the like). Other ways of determining to which digital events the target digital event may be connected is further described in U.S. Patent Application No. 63/192,316, which is incorporated by reference in its entirety.

In a third implementation, the feature extractor may function to derive one or more features relating to a velocity of one or properties defined in the digital event data. A feature velocity may generally indicate a count of unique instances (e.g., distinct digital events) that have a common respective property (e.g., common user ID, email address, IP address, browser cookie, shipping address, payment method, item(s) being purchased, and/or the like) over a target period (e.g., the last 15 mins, 1 hour, 1 day, 15 days, 1 month, 3 months, and/or the like). For instance, in a non-limiting example, if the digital event data defines that the target digital event occurred at a first IP address, the feature extractor may derive a feature that indicates a count of user accounts that have been created with the first IP address over the last 15 mins (or 1 hour, 1 day, 15 days, 1 month, 3 months, and/or the like). The feature extractor may additionally, or alternatively, derive one or more other velocity features relating to the IP address of the target digital event and/or may derive one or more other velocity features relating to other properties of the target digital event in similar ways described above.

In a fourth implementation, the feature extractor may function to derive one or more features relating to a count of one or properties defined in the digital event data. A count-based feature may generally indicate a total count of unique instances (e.g., distinct digital events) that have a common respective property (e.g., common user ID, email address, IP address, browser cookie, shipping address, payment method, item(s) being purchased, and/or the like). For instance, in a non-limiting example, if the digital event data defines that the target digital event occurred at a first IP address, the feature extractor may derive a feature that indicates a total number of user accounts that have been observed on the first IP address. In general, a counting-based feature for a particular property of the target digital event may not be bounded by time, whereas a velocity-based feature of the particular property of the target digital event may be bounded by time.

In one or embodiments, after collecting, identifying, or deriving one or more features about the target digital event via the feature extractor, S210 may function to construct or generate a feature corpus that includes the one or more collected, identified, or derived features of the target digital event. As will be described in more detail in the later steps of method 200, the constructed feature corpus may be provided as input into one more automated fraud machine learning models and/or may be used to evaluate the features of the digital event against route conditions defined in an automated fraud detection workflow. Additionally, or alternatively, the feature corpus may be accessible or made available for constructing distinct subsets of the feature corpus for constructing digital event embedding signatures and/or reputational graphs, as described in more detail herein.

2.20 Digital Event Evaluation|Routing

S220, which includes assessing one or more properties or features of a target digital event, may function to perform an automated assessment of the target digital event against a plurality of distinct threat or abuse detection routes defined in an automated fraud detection workflow. In a preferred embodiment, the automated fraud detection workflow may be constructed to include one or more fraud detection criteria that may be used to assess whether the target digital event originated via a genuine digital user or a malicious bot.

Automated Fraud Detection Workflow Composition/Structure

Figure 3:
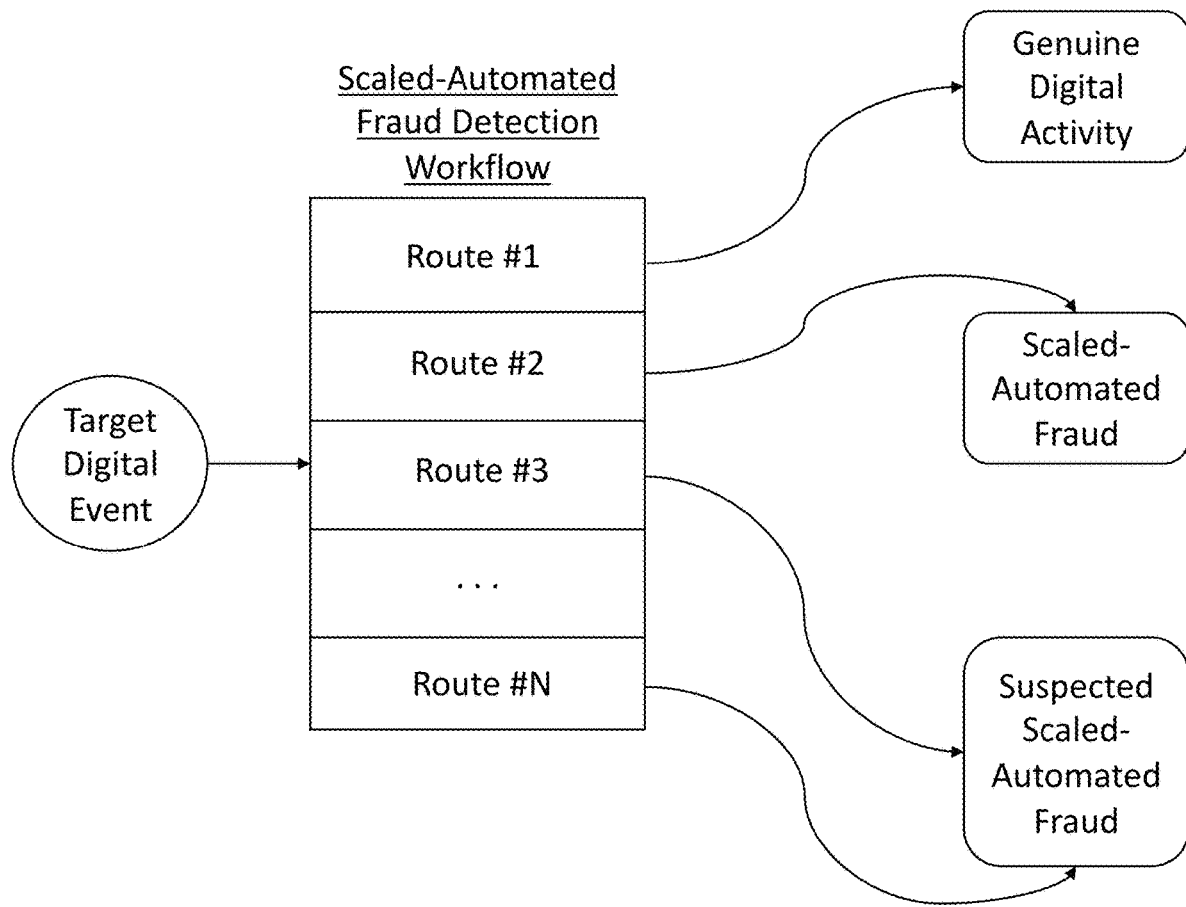
FIG. 3 illustrates a schematic representation of an automated fraud or abuse detection workflow in accordance with one or more embodiments of the present application.

In one or more embodiments, as generally illustrated in FIG. 3, an automated fraud detection workflow may include one or more fraud detection routes directed to handling/processing the target digital event as automated fraud activity (e.g., originated via a malicious bot), one or more fraud detection routes directed to handling/processing the target digital event as genuine digital activity (e.g., originated via a genuine digital user), and/or one or more fraud detection routes directed to handling/processing the target digital event as suspected automated fraud activity (e.g., requiring further analysis by the system or service implementing method 200). In the aggregate, these distinct routes of the automated fraud detection workflow may be referred to as automated threat mitigation or digital event disposal routes.

In one or more embodiments, the automated fraud detection workflow may define at least one route condition or criteria for each threat mitigation or event disposal route of the automated fraud detection workflow—which optionally governs when that corresponding fraud detection route will be executed. That is, in some embodiments, if features and/or data associated with a target digital event satisfies a given route condition or route criteria, the associated route may be executed to automatically mitigate an associated threat or dispose the event as a non-threat. For instance, in a non-limiting example, the automated fraud detection workflow may include a first, second, third, and the like fraud detection route that corresponds to a first, second, third, and the like route condition, respectively. In such an example, the first route defined in the automated fraud detection workflow may be executed, by the system implementing method 200, in response to determining that the properties, attributes, or features of the target digital event satisfy the first route condition. Conversely, the first route may not be executed, by the system implementing method 200, in response to determining that the properties, attributes, or features of the target digital event do not satisfy the first route condition. The other fraud detection routes of the automated fraud detection workflow may be executed (or not executed), by the system implementing method 200, for analogous reasons described above with respect to the first fraud detection route.

In one or more embodiments, a route condition of a first, second, third fourth, fifth, and the like fraud detection route directed to handling the target digital event as automated fraud activity optionally includes velocity-based and/or count-based criteria requiring that a velocity or a count of a first, second, third, fourth, fifth, and the like property or attribute of the target digital event be greater than (or greater than or equal to) a predetermined maximum value (e.g., upper limit threshold value, ceiling value, and/or the like). For instance, in a non-limiting example, the route condition of the first fraud detection route may include a first criterion that requires the IP address of the target digital event to have been used by at least a first number (e.g., 50, 100, 200, 500, and/or the like) of user accounts during a respective amount of time (e.g., past 1 day, 15 days, 30 days, 1 month, 5 months, and/or the like).

It should be understood that the route condition of the first fraud detection route (and/or the second, third, fourth, fifth, and/or the like fraud detection routes) may include N number of velocity-based or counting-based criteria in addition, or as an alternative to the first criterion described above (e.g., such as a second criterion requiring that the digital user account corresponding to the target digital event to have ordered more than a first amount (e.g., $400, $700, $3,000, $15,000, $100,000, and/or the like) during a respective amount of time (e.g., last 1 hour, 1 day, 1 week, 1 month, and/or the like)). It shall also be noted that, in some embodiments, including, in a route condition of a fraud detection route directed to handling/processing the target digital event as automated fraud activity, one or more criteria requiring that a velocity or count of a property or attribute of a target digital be above a predetermined maximum value may enable the scaled automated fraud detection workflow to detect digital events that originated via a high-throughput, volume-based automated fraud attack.

In one or more embodiments, a route condition of a first, second, third fourth, fifth, and/or the like fraud detection route directed to handling the target digital event as genuine digital activity optionally includes velocity-based and/or count-based criteria requiring that a velocity or count of a first, second, third, fourth, fifth, and/or the like property or attribute of the target digital event be less than (or less than or equal to) a predetermined minimum value (e.g., lower limit threshold value, floor value, and/or the like). For instance, in a non-limiting example, the route condition of the first fraud detection route may include a first criterion that requires the IP address of the target digital event to be used by less than a first number (e.g., 1, 2, 3, 4, and the like) of other user accounts during a respective amount of time (e.g., past 1 day, 15 days, 30 days, 1 month, 5 months, and the like).

It should be understood that the route condition of the first fraud detection route (and/or the second, third, fourth, fifth, and the like fraud detection routes) may include N number of velocity-based or counting-based criteria in addition, or as an alternative, to the first criterion described above (e.g., such as a second criterion requiring that the user account corresponding to the target digital event to have ordered less than a second amount (e.g., $50, $100, $150, $300, and/or the like) during a respective amount of time (e.g., last 1 hour, 1 day, 1 week, 1 month, and/or the like). It shall also be noted that, in some embodiments, including, in a route condition of a fraud detection route directed to handling/processing the target digital event as genuine digital activity, criteria requiring that a velocity or count of a property or attribute of a target digital be lower than a predetermined minimum value optionally enables the scaled automated fraud detection workflow to detect genuine digital activity (e.g., originated via a genuine digital user).

In one or more embodiments, a route condition of a first, second, third, fourth, fifth, and/or the like fraud detection route directed to handing the target digital event as a suspected automated fraud activity optionally includes velocity-based and/or count-based criteria requiring that a velocity or a count of a first, second, third, fourth, fifth, and the like property or attribute be bounded between a predetermined minimum and maximum value. For instance, in a non-limiting example, the route condition of the first fraud detection route may include a criterion that requires of the IP address of the target digital event to be used by more than a first number (e.g., 1, 2, 3, 4, and the like) and less than a second number (e.g., 50, 100, 200, 500, and the like) of other user accounts during a respective amount of time (e.g., past 1 day, 15 days, 30 days, 1 month, 5 months, and the like).

It should be understood that the route condition of the first fraud detection route (and/or the second, third, fourth, fifth, and the like fraud detection routes) may include N number of velocity-based or counting-based criteria in addition, or as an alternative to the first criterion described above (e.g., such as a second criterion requiring that the user account corresponding to the target digital event to have ordered more than a first amount (e.g., $50, $100, $150, $300, and the like) and less than a second amount (e.g., $400, $700, $3,000, $15,000, and the like) during a respective amount of time (e.g., last 1 hour, 1 day, 1 week, 1 month, and the like). It shall also be noted that, in some embodiments, including, in a route condition of a fraud detection route directed to handling/processing the target digital event as suspected automated fraud activity, criteria requiring that a velocity or count of a property or attribute of a target digital be between a predetermined minimum and maximum value optionally enables the scaled automated fraud detection workflow to detect digital events that may have originated via a low-throughput, low volume-based automated fraud attack.

Digital Event Assessment and Routing

In one or more embodiments, in response to S210 identifying the target digital event, S220 may function to determine if the feature(s) or propert(ies) of the target digital event satisfy one or more route conditions defined in the automated fraud detection workflow. For instance, S220 may function to determine that the features or properties of the target digital event satisfy a first route condition of a first fraud detection route in the automated fraud detection workflow (or a second route condition of a second fraud detection route in the automated fraud detection workflow, a third route condition of a third fraud detection route in the automated fraud detection workflow, and/or the like).

In response to S220 determining that the features or properties of the target digital event satisfy the first route condition, the automated fraud detection workflow may route the target digital event to the first fraud detection route. If the first fraud detection route relates to processing the target digital event as automated fraud activity, the first fraud detection may classify the target digital event as an automated digital fraud or abuse and preferably, may generate a threat mitigation decision to not allow the target digital event to be processed to completion (e.g., block digital event, deny transaction, deny user activity, and/or the like). Conversely, if the first fraud detection relates to processing the target digital event as genuine digital activity, the first fraud detection route may classify the target digital event as a non-automated digital fraud or abuse and may produce a disposal decision that enables the target digital event to be processed to completion (e.g., allow transaction, allow user activity, and/or the like).

Additionally, or alternatively, the automated fraud detection workflow may include a distinct enhanced detection route that, if satisfied or triggered by the evaluation of the target digital event, may function to escalate an evaluation of the target digital event as a suspected and/or sophisticated automated fraud or abuse attack. Accordingly, a satisfaction of the enhanced detection route may cause an automatic instantiation of a multi-component threat feature identification and assessment together with an instantiation of an advance machine learning-based threat prediction system or module, as described in more detail below.

2.30 Digital Activity Signature Computation|Signature-Informed Fraud Sub-Type Classification S230, which includes classifying an embedding signature of a suspected automated attack, may function to generate a digital activity signature based on an identified digital event activity sequence. Additionally, or alternatively, S230 may function to classify the suspected automated attack based on evaluating the generated digital activity signature against one or more malicious digital fraud or digital abuse signatures.

It shall be noted that, in one or more embodiments, one or more functions of S230 may or may not be invoked based on the routing of the target digital event in S230. For instance, in a non-limiting example, if the automated fraud detection workflow route (described in S220) disposes of the target digital event via a route directed to handling/processing the target digital event as automated fraud activity or as genuine digital activity, one or more functions of S230 may not be invoked. Conversely, if the automated fraud detection workflow route (described in S220) disposes of the target digital event via a route directed to handling/processing the target digital event as suspected automated fraud activity, one or more functions of S230 may be invoked. In such non-limiting example, the automated fraud detection workflow may include a dedicated route that, if executed or activated, escalates a digital fraud or attack assessment of a target digital event to one or more machine learning-driven automated fraud detection modules or subsystems.

Figure 4A:
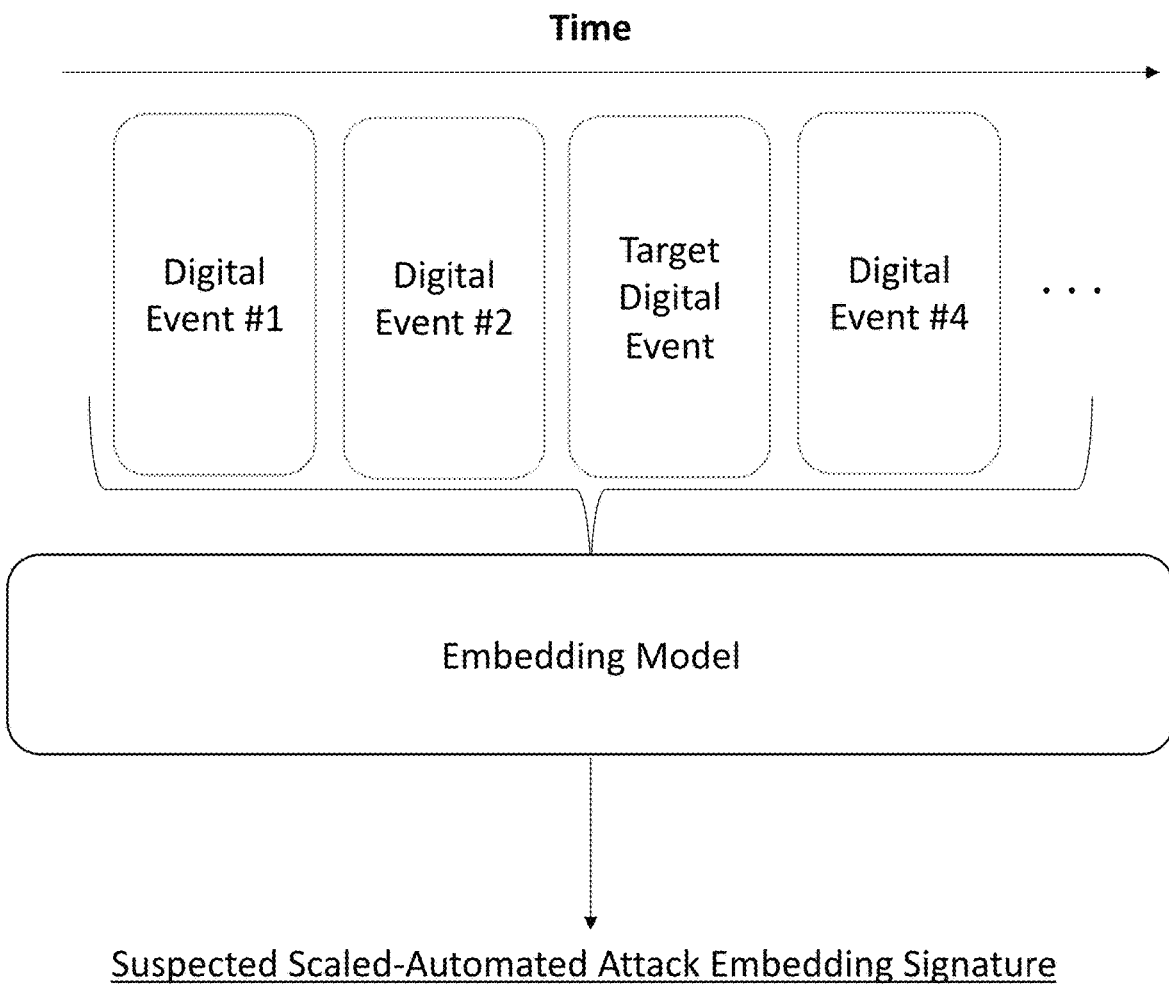
FIG. 4A illustrates an exemplary process for generating an embedding signature of a suspected automated fraud or abuse attack in accordance with one or more embodiments of the present application.
Figure 4B:
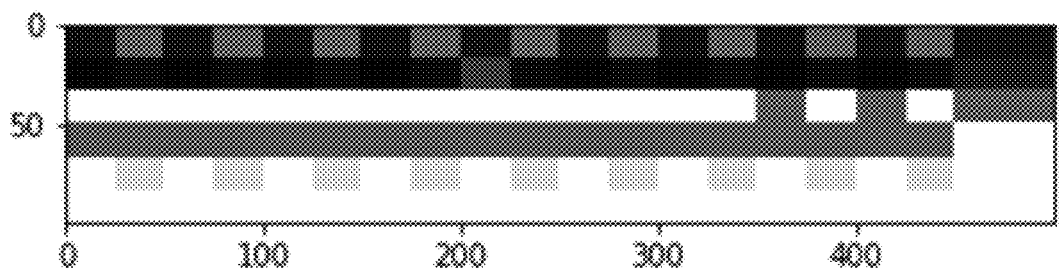
FIG. 4B illustrates example graphical representations of digital fraud or abuse activity signatures in accordance with one or more embodiments of the present application.
Figure 4B:
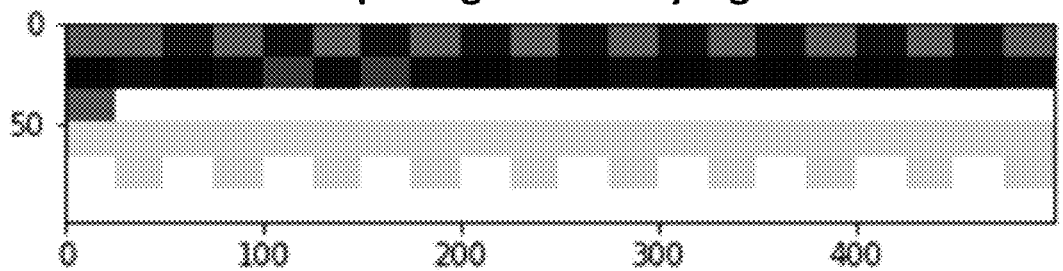
Figure 4B:
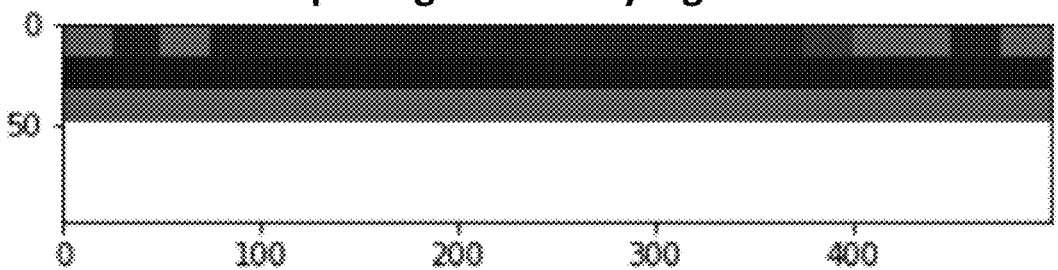
Figure 4B:
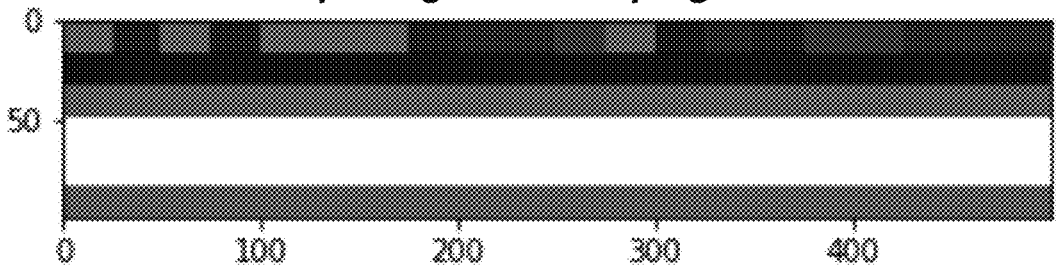

In some embodiments, as generally illustrated in FIG. 4B, the digital activity signature may include a digital activity sequence graph. In some embodiments, each distinct location of the digital activity sequence graph may correspond to a target digital event associated with the suspected automated fraud or abuse attack and/or may correspond to a subject digital event feature. Additionally, or alternatively, in some embodiments, each distinct location on the digital activity sequence graph may visually indicate a value of the subject digital event feature for the target digital event.

Furthermore, in some embodiments, as also generally illustrated in FIG. 4B, the digital activity sequence graph may include a first axis and a second axis. In one example of such embodiments, each distinct position along the first axis may relate to a distinct digital event associated with the suspected automated fraud or abuse attack. Additionally, or alternatively, in some embodiments, each distinct position along the second axis may relate to a distinct digital event feature. It shall be noted that, in some embodiments, a position of a subject digital event on the first axis may be based on a chronological order of the digital activity associated with a suspected automated fraud or abuse attack.

Deriving a Digital Event Activity Sequence

In one or more embodiments, the digital event activity sequence derived or identified by S230 may relate to or indicate an order in which at least a subset of the digital activities associated with the target digital event occurred. For instance, in a non-limiting example, the subset of digital activity may include 10, 20, 50, 100, 200, 500, and/or the like distinct digital activities performed in association with or in the performance of the target digital event, and S230 may function to derive a digital activity order or sequence in which a subset of distinct digital activities may be arranged in a chronological order that may inform an identification of the target digital event as a distinct automated fraud attack or the like.

In a preferred embodiment, a digital activity may have been selected for inclusion in the subset of digital activities associated with the target digital event based on the digital activity having a degree of probative value that may establish whether or not the target digital event may be associated with an automated attack. For instance, in a non-limiting example, a subset of the digital activities may include a collection of digital actions performed by an online user attempting to or completing a digital transaction including, for example, logging into a digital account activity, selecting one or more items to purchase activity, navigating to one or more distinct webpages of an online interface activity, using the digital account to complete a purchase activity, and/or the like.

Accordingly, the subset of digital activities associated with the target digital event that may be used to derive a digital event activity sequence may not include all the digital activities associated with the target digital event, but rather a subset of digital activities associated with the target digital event.

Computing an Embedding Signature

In one or more embodiments, S230 may function to generate, via an embeddings machine learning model, an embedding signature (i.e., embedding value or vector) for the target digital event based on the digital event activity sequence. In such embodiments, a target digital event sequence may be converted by an embeddings model, such as an autoencoder, to a unique vector mapped to a multi-dimensional space that includes a volume of distinct embedding signatures or vectors for a plurality of distinct target digital events.

Accordingly, in a first implementation, S230 may function to provide the identified or derived digital event activity sequence (described above) to an embeddings machine learning model. In response to S230 providing the identified or derived digital event activity sequence to the embeddings machine learning model, the embeddings machine learning model may produce, as output, a corresponding embedding signature (as generally illustrated in FIG. 4A). It shall be noted that the term "embedding signature" may also be referred to herein as an "encoded or compressed digital activity signature."

It shall be recognized that the embedding signature or embedding value generated by an embeddings model may vary depending on the variations of the input target digital event sequence. For instance, in a non-limiting example, if S230 functions to provide, as input, a first identified or derived digital event activity sequence to the embeddings machine learning model, the embeddings machine learning may produce, as output, a first embedding signature (e.g., a first vector representation of the first identified or derived digital event activity sequence). Conversely, if S230 functions to provide, as input, a second identified or derived digital event activity sequence to the embeddings machine learning model, the embeddings machine learning may produce, as output, a second embedding signature, different from the first embedding signature (e.g., a second vector representation of the identified or derived second digital event activity sequence). In a preferred embodiment, the embeddings model may be an Autoencoder model. While the above description describes examples in which an embeddings signature may be generated via an embedding or Autoencoder model, it should be understood that an embedding signature may also be generated via any suitable machine learning model including, but not limited to, variations of the machine learning models described herein.

Additionally, or alternatively, in a second implementation, S230 may function to construct a digital activity signature that graphically represents the identified digital event activity sequence (e.g., suspected automated fraud attack). For instance, as generally illustrated in FIG. 4B, in a non-limiting example, S230 may function to graphically plot or chart enumerated values of n-number of features for one or more digital events (e.g., multiple digital events, all digital events, and/or the like) in the identified digital event activity sequence (e.g., graphically indicate that a first, second, third, . . . , nth feature of the first, second, third, or the like digital event in the digital event activity sequence have a first, second, third, . . . , nth value, or the like). It shall also be noted, as generally illustrated in FIG. 4B, the plotted enumerated values may be arranged linearly with respect to time and may be visually emphasized or marked based on its respective magnitude, frequency, semantic meaning, and/or the like. After generating the digital event signature that graphically represents the identified digital event activity sequence, S230 may function to provide the digital event signature as input to the above-described embeddings model, which in turn, may produce, as output, a corresponding embedding signature in analogous ways previously described.

Querying Embedding Signature Registry

Figure 4C:
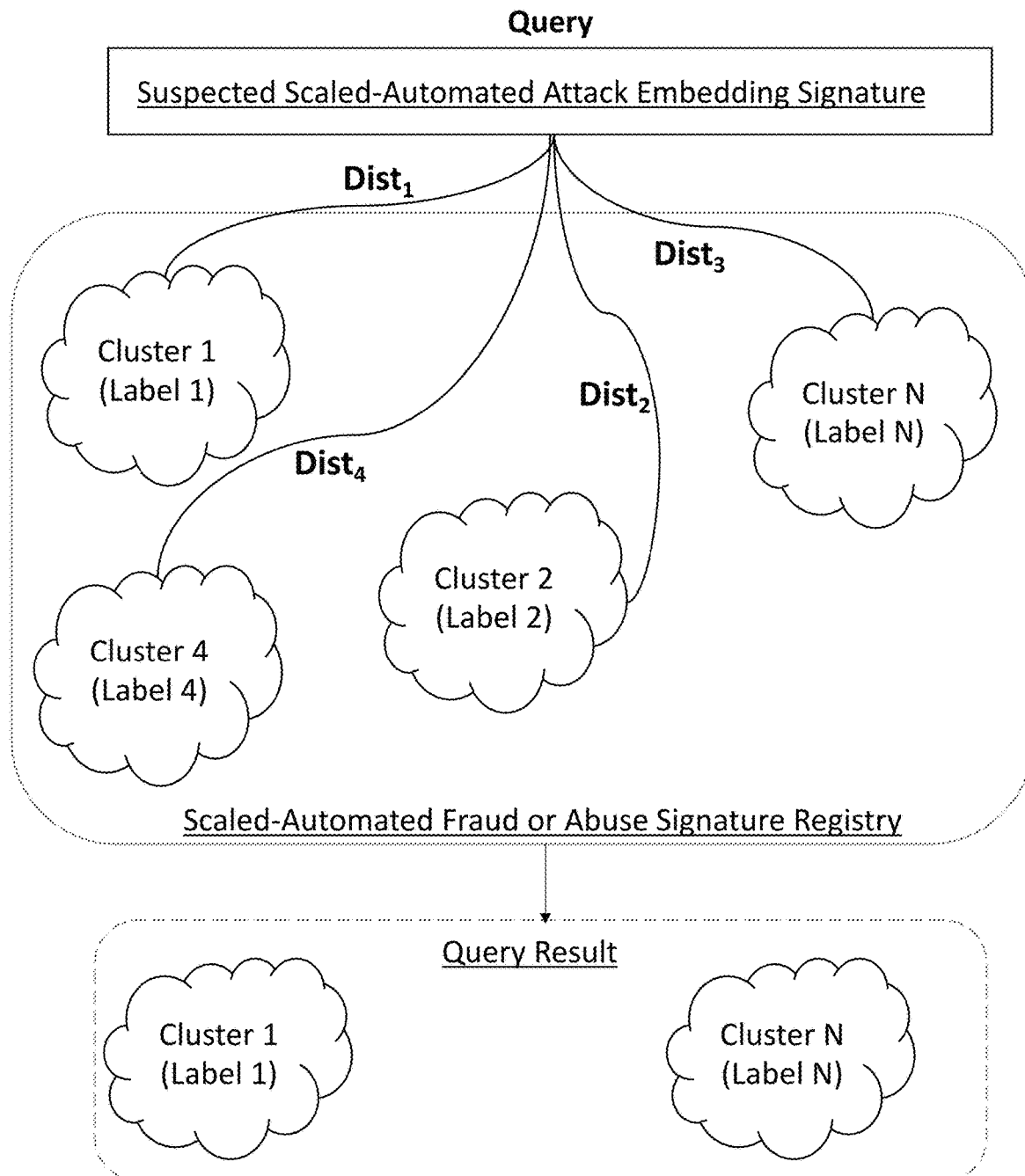
FIG. 4C illustrates a schematic representation of querying an automated fraud or abuse signature registry in accordance with one or more embodiments of the present application.

In one or more embodiments, S230 may function to query an automated fraud or abuse signature registry to label or classify an identified or derived digital event activity sequence (e.g., the embedding signature of the suspected automated fraud attack) of a target digital event, as will now be described below and as generally illustrated in FIG. 4C. For instance, in a non-limiting example, S230 may function to submit a query that includes a derived digital event activity sequence to the automated fraud or abuse signature registry, which, in turn, may be converted to an embedding value, by an embeddings model, that may be used to perform a search or for an evaluation against the plurality of distinct embedding signatures of the automated fraud or abuse signature registry. In some embodiments, if the search of the embedding signature registry returns a matching or substantially matching embedding signature, S230 may function to classify the target digital event associated with the derived digital event sequence with the same classification label associated with the returned embedding signature, as described in more detail below.

It shall be recognized that, in some embodiments, the embedding signature registry comprises a multi-dimensional embedding space that may include a volume of distinct classified or labeled embedding signatures. In such embodiments, a query of a derived digital event sequence may be converted to an embedding value (i.e., an embedding signature) and a search of the multi-dimensional space performed using the embedding value. In such embodiments, the search may include performing one or more cluster identification techniques (e.g., a k-nearest neighbor or the like) to identify whether the embedding value maps to a cluster of embedding signatures of the multi-dimensional embedding space. In some embodiments, distinct clusters of the multi-dimensional space may be associated with a distinct classification label that may identify a type of automated attack.

Consequently, in response to executing the query, the query optionally returns one or more clusters that are "close" to the first embedding signature (e.g., returns the clusters in the automated fraud or abuse signature registry that are within a predetermined cosine or Euclidean distance threshold (e.g., 0.0, 0.1, 0.2, 0.5, 0.7, 1, 1.3, 1.5, 1.9, and/or the like) from the embedding signature of the identified digital event activity sequence). For instance, in response to S23o executing the above-described query, the query may return a first, second, third, fourth, and/or the like cluster in the automated fraud or abuse signature registry because the first, second, third, and/or the like cluster may be within the above-described distance threshold from the embedding signature of the identified digital event activity sequence. Alternatively, to the example described above, in one or more embodiments, in response to executing the query, the query may return zero clusters (e.g., no clusters in the automated fraud or abuse signature registry are within a predetermined cosine or Euclidean distance threshold from the embedding signature of the identified digital event activity sequence).

In a preferred embodiment, one or more clusters defined in the automated fraud or abuse signature registry may correspond to a distinct fraud or abuse label. For instance, in a non-limiting example, a first, second, third, fourth, and/or the like cluster defined in the automated fraud or abuse registry may correspond to a first (e.g., credential stuffing), second (e.g., card testing), third (e.g., denial of service), fourth (e.g., account take over), and/or the like fraud or abuse label, respectively.

Furthermore, in some embodiments, S230 may function to construct the above described signature registry. In one example of such embodiments, constructing the signature registry may include composing a plurality of distinct digital activity signatures for a plurality of distinct automated fraud or abuse machine attacks; computing, via one or more machine learning models, an encoded representation of the plurality of distinct digital activity signatures; implementing one or more unsupervised machine learning models that: (a) receive model input comprising the plurality of distinct digital activity signatures, and (b) predict a plurality of distinct clusters of digital activity signatures based on the model input; assessing the plurality of distinct clusters of digital activity signatures; and associating metadata with each of the plurality of distinct clusters based on the assessing, wherein associating metadata with a target cluster of digital activity signatures includes attributing an automated fraud or abuse attack label to the target cluster.

Identifying Automated Attack Fraud or Abuse Label

In one or more embodiments, S230 may function to classify or label the embedding signature of the identified digital event activity sequence (e.g., suspected automated fraud attack) based on the clusters returned from executing the above-described query. For instance, in a non-limiting example, if the query returned a first, second, third, and/or the like cluster defined in the automated fraud or abuse registry that correspond to a first (e.g., credential stuffing), second (e.g., card testing), third (e.g., account take over), and/or the like fraud or abuse label, respectively, S230 may function to label the identified digital event activity with the first, second, and/or third, and/or the like fraud or abuse label.

Alternatively, to the embodiment described above in which S230 optionally functions to label the identified digital event activity sequence based on multiple clusters returned from the automated fraud or abuse signature repository, S230 optionally labels the identified digital event activity sequence based on the cluster returned from the above-described query that may be closest to the embedding signature of the identified digital event activity sequence (e.g., suspected automated fraud attack). For instance, in a non-limiting example, if the query returns a first, second, third, and/or the like cluster defined in the automated fraud or abuse registry corresponding to a first (e.g., credential stuffing), second (e.g., card testing), third (e.g., account take over), and/or the like fraud or abuse label, respectively, S230 may function to label the embedding signature of the identified digital event activity sequence with the first label (e.g., credential stuffing) if the second, third, and the like clusters are further from the embedding signature of the identified digital event activity sequence than the first cluster.

In one or more embodiments, S230 may function to prompt a subscriber of the system or service implementing method 200 to assign a label or confirm the system-determined label assigned to the embedding signature of the identified digital event activity sequence (e.g., suspected automated fraud or abuse attack). For instance, in a first implementation, if the above-described query does not return any clusters defined in the automated fraud or abuse registry (for reasons previously described), S230 may function to prompt the subscriber to classify or label the embedding signature of the identified digital event activity sequence, and thereafter, label the embedding signature of the identified digital event activity sequence in accordance with the subscriber-provided classification or label. For instance, if S230 receives an input, from the subscriber, indicating that the embedding signature of the identified digital event activity sequence corresponds to a first fraud or abuse type (e.g., credential stuffing), S230 may function to label the embedding signature of the identified digital event activity sequence as the first fraud or abuse type. It shall be noted that in some embodiments, when prompting the user to classify or label the embedding signature of the identified digital event activity sequence, the constructed graphical representation of the identified digital event activity sequence (previously described) may be displayed to the subscriber.

S230 may additionally, or alternatively, function to prompt the subscriber to confirm a system-determined label assigned to the embedding signature of the identified digital event activity sequence (e.g., suspected automated fraud attack). For instance, in a second non-limiting example, if S230 assigns a first fraud or abuse label (e.g., card testing) to the embedding signature of the identified digital event activity sequence (for one or more reasons described above), S230 may function to prompt the subscriber to confirm or reject that the embedding signature of the identified digital event activity sequence corresponds to the first fraud or abuse label (e.g., card testing).

It shall be noted that in some embodiments, when prompting the user to confirm a system-determined label assigned to the embedding signature of the identified digital event activity sequence, a representation of the digital events included in the identified digital event activity sequence and/or the constructed graphical representation of the identified digital event activity sequence may be displayed to the subscriber. As will be described in greater detail in S250, in response to the subscriber indicating that the identified digital event activity sequence corresponds to an automated fraud attack (e.g., via confirming the system-assigned label or via other means), the service or system implementing method 200 may function to display, to the subscriber, one or more mitigation options, such as blocking one or more users, IP addresses, devices, and/or credit cards, and/or the like associated with the identified digital event activity sequence or the target digital event.

2.40 Reputation Graph Construction|Reputation Identification

S240, which includes constructing a reputation graph, may function to construct and/or encode a reputation graph that includes reputational characteristics or attributes relating to a target digital event. Additionally, or alternatively, S240 may function to derive or estimate a reputation classification of the target digital event based on the constructed reputation graph. It shall be recognized that one or more functions of S240 may be performed independently of, concurrently with, before, or after the one or more functions of S230.

Constructing the Reputation Graph

In one or more embodiments, S240 may function to add one or more distinct feature nodes to the reputation graph. In a preferred embodiment, the one or more distinct feature nodes added to the reputation graph may correspond to one or more distinct probative features derived and/or identified from the target digital event data. For instance, in a non-limiting example, if the feature extractor described in S210 extracts features from the target digital event data, S240 may function to initialize the reputation graph and add (e.g., construct) nodes corresponding to all or a subset of the features extracted from the target digital event data.

Figure 5:
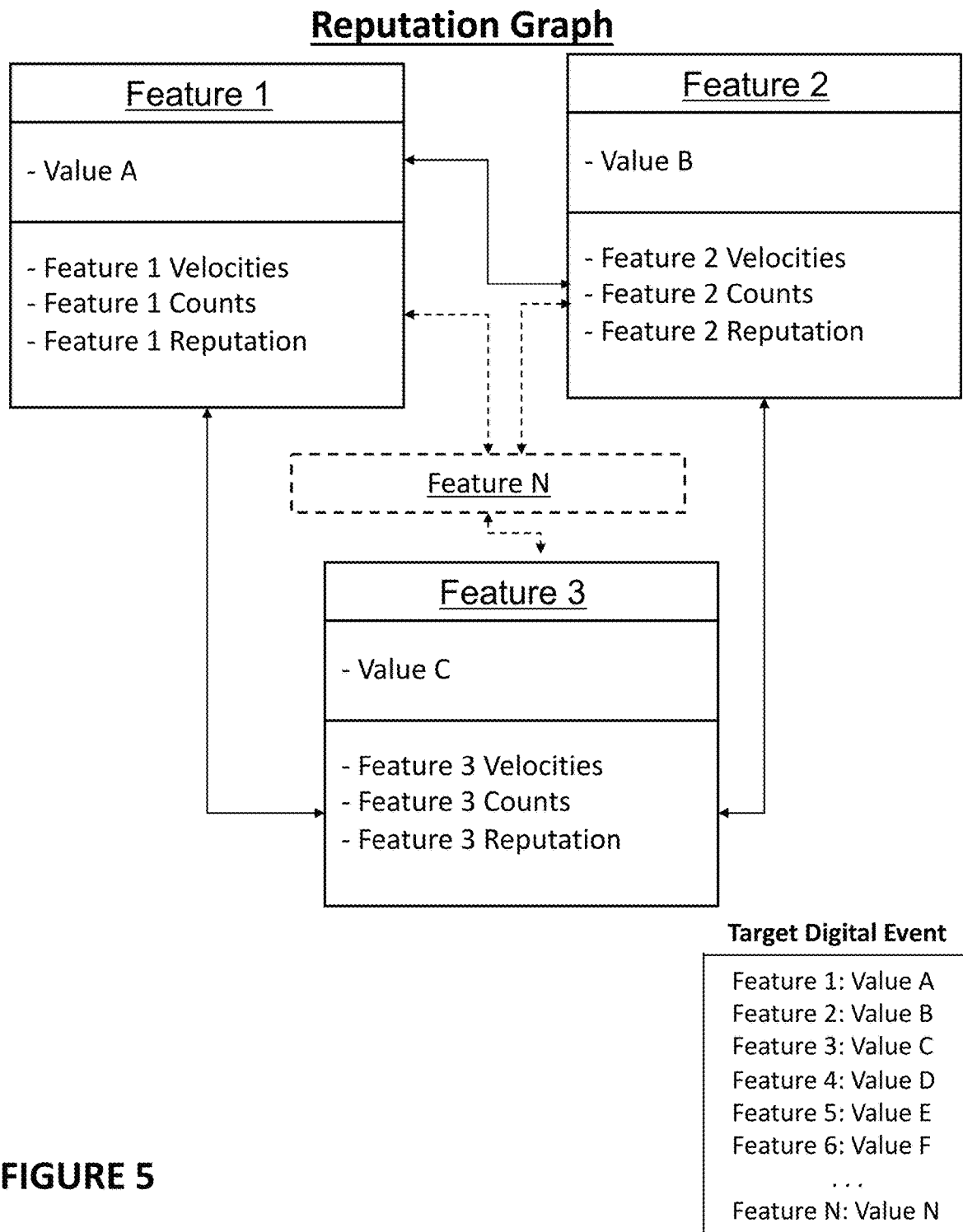
FIG. 5 illustrates a schematic representation of a reputation graph in accordance with one or more embodiments of the present application.

In one or more embodiments, after (or while) adding or constructing one or more nodes to the reputation graph, S240 may function to set or define a value for the one or more added nodes. For instance, in a non-limiting example, if the reputation graph includes a first node corresponding to a first probative feature (e.g., IP address) of the target digital event, S240 may function to set the value of the first node to correspond to the value of the first feature for the target digital event (e.g., if the value of the first feature of the target digital event is a first value (e.g., a first IP address), S240 may set the first node to the first value (e.g., the first IP address)), as generally illustrated in FIG. 5. It should be understood by one of ordinary skill in the art that the values of one or more other nodes in the reputation graph may be set or defined in analogous ways described above.

Querying Connected Component Graphs

In one or more embodiments, S240 may function to query a connected component graph to collect count-based data or classification-based data for encoding one or more respective nodes in the reputation graph (e.g., optionally count-based information relating to a different (e.g., longer or shorter) time span than initially collected by S210). It shall be noted for querying a connected component graph reference may be made to U.S. Patent Application No. 63/192,316, which is incorporated herein in its entirety by this reference. For instance, in a non-limiting example, if a respective node in the reputation graph corresponds to an "IP address" node, S240 may function to query a connected component graph whose nodes (e.g., user accounts, logins, orders, and/or the like) are connected by a common IP address to count how many distinct nodes (e.g., user accounts, logins, orders, and/or the like) are connected by the IP address stored in the respective node.

It shall be noted that S240 may function to query a connected component graph database based on feature values associated with each of the respective feature nodes in the reputation graph in one or more analogous ways described above. For instance, in a non-limiting example, if a respective node in the reputation graph corresponds to a "Shipping Address" node, S240 may function to query a connected component graph whose nodes (e.g., orders, user accounts, and/or the like) are connected by a common shipping address to count how many distinct nodes (e.g., orders, user accounts, and/or the like) may be connected by the shipping address stored in the respective node.

Additionally, or alternatively, S240 may function to query a connected component graph database or the like to derive or collect velocity-based information for one or more respective nodes in the reputation graph (e.g., optionally velocity-based information relating to a different (e.g., longer or shorter) time span than initially collected by S210). For instance, in a non-limiting example, if a respective node in the reputation graph corresponds to a "Credit Card" node, S240 may function to query a connected component graph whose nodes (e.g., user accounts, orders, and/or the like) are connected by a common credit card to count how many distinct nodes (e.g., user accounts, orders) are connected by the credit card stored in the respective node in the last 1 hour, 5 hours, 24 hours, 3 months, 6 months, 1 year, and/or the like.

It shall be noted that S240 may function to query a connected graph for other nodes in the reputation graph in one or more analogous ways described above. For instance, in a non-limiting example, if a respective node in the reputation graph corresponds to an "Email Address" node, S240 may function to query a connected component graph whose nodes (e.g., user accounts, orders, and/or the like) are connected by a common email address (i.e., the email address value of the "Email Address" node) to count how many distinct nodes (e.g., user accounts, orders, and/or the like) in the connected component graph are connected by the target email address value.

Additionally, or alternatively, S240 may function to query a malicious connected component graph to determine a digital fraud or digital abuse label for one or more respective nodes in the reputation graph. For instance, in a non-limiting example, if a respective node in the reputation graph corresponds to an "IP address" node, S240 may function query a malicious connected component graph whose nodes (e.g., IP addresses) are connected by a common entity (e.g., user account, login, and/or the like) to determine if the IP address value encoded to the respective node of the reputation graph exists in the malicious connected component graph.

It shall be noted that S240 may function to query a connected graph for other nodes in the reputation graph in one or more analogous ways described above. For instance, in a non-limiting example, if a respective node in the reputation graph corresponds to a "Credit Card" node, S240 may function query a malicious connected component graph whose nodes (e.g., Credit Cards) are connected by a common entity (e.g., user account, login, and/or the like) to determine if the credit card number stored in the respective node exists in the malicious connected component graph.

Annotating or Encoding Nodes in the Reputation Graph with Derived Feature Data

In one or more embodiments, as generally illustrated in FIG. 5, based acquiring or deriving additional feature data by performing a count-based, velocity-based, and/or reputation-based query (e.g., the same as or similar to the one or more queries described above), S240 may function to annotate or encode a corresponding feature node in the reputation graph associated with a target digital event in accordance with the result/response of the performed query. For instance, in a first non-limiting example, if a count-based query returns than an IP address stored in a respective node in the reputation graph may be connected to 0 or a number of distinct user accounts, S240 may function to store the result (e.g., count information) of the query as an attribute in the respective node (e.g., a count-based attribute).

Similarly, in a second non-limiting example, if a velocity-based query returns that a credit card number stored in a respective node in the reputation graph may be connected to 0 or a number of distinct users over a designated period, S240 may function to store the result (e.g., velocity information) of the query as an attribute in the respective node (e.g., a velocity-based attribute). Furthermore, in a third non-limiting example, if a reputation-based query returns that a credit card number stored in a respective node in the reputation graph exists in a connected component graph having assigned a malicious classification label, S240 may function to store the result (e.g., reputation information) of the query as a derived attribute in the respective node (e.g., a reputation-based attribute). It shall be noted that S240 may function to add attributes to other respective nodes in the reputation graph in one or more analogous ways described above.

In one or more embodiments, S240 may function to label the target digital event (e.g., the target digital event identified by S210) based on feature-related data associated with the reputation graph of the target digital event. For instance, in a non-limiting example, S240 may function to assign a "positive fraud label" to the target digital event if S240 determines that at least one node in the reputation graph includes an attribute that indicates the value of the at least one node was discovered in a malicious connected component graph. Conversely, S240 may function to assign a "negative fraud label" to the target digital event if S240 determines that no node in the reputation graph includes an attribute that indicates the value of a respective node exists in a malicious connected component graph. In some embodiments, S240 may function to compute a reputation value, in the form of a reputation score and/or a digital fraud probability, based on the feature-related data associated with the reputation graph.

2.50 Predicting Automated Fraud or Abuse Threat Score & Classification(s)

S250, which includes generating an automated digital fraud or abuse threat score, may function to compute an automated attack threat score and threat classification(s) for the target digital event using one or more trained predictive automated fraud or abuse models. The one or more trained predictive automated fraud or abuse models may function to receive model input based on model input data derived from the constructed reputation graph (S240) and/or the generated embedding signature (S230), as will be described in more detail below. As an example, a first model input may be derived from the embedding signature classification of the target digital event and a second model input may be derived based on a reputation classification and/or reputation threat score associated with the target digital event.

Implementing an Ensemble of Predictive Automated Fraud or Abuse Models

In one or more embodiments, S250 may function to predict the automated attack threat score of the target digital event via an ensemble of predictive automated fraud or abuse models. The ensemble of predictive automated fraud or abuse models optionally include a plurality of predictive models that may be trained to predict if the target digital event relates to a particular type of fraud or abuse. For instance, in a non-limiting example, the ensemble of predictive automated fraud or abuse models optionally includes a plurality of distinct automated fraud model that that may be trained to predict if the target digital event relates to one of a plurality of distinct automated digital fraud or abuse (e.g., card testing, credential stuffing, credential cracking, ad/click fraud, fake user account creation, malicious account misappropriation, and/or the like).

In one or more embodiments, S250 may function to provide the feature values, classification labels, or attributes of one or more nodes in the reputation graph (described above with respect to S240) as model input to the ensemble of predictive automated fraud or abuse models. For instance, in a non-limiting example, S250 may function to provide, as input, to the ensemble of predictive automated fraud or abuse models, one or more count-based attributes, velocity-based attributes, reputation-based attributes, classification labels, and/or values (e.g., optionally in the form of a corresponding embedding value) defined at one or more of the plurality of distinct nodes in the reputation graph.

In response to the ensemble of predictive automated fraud or abuse models receiving model input data, the distinct automated fraud models included in the ensemble of predictive automated fraud or abuse models may compute one or more threat scores that may indicate a probability that the target digital event relates to a particular type of automated digital fraud or abuse. For instance, a distinct automated fraud model in the ensemble of predictive automated fraud or abuse models may predict that the target digital event relates to a first type of fraud or abuse (e.g., card testing) with a first amount, probability, or degree of confidence, a second model of the ensemble may predict that the target digital event relates to a second type of fraud or abuse (e.g., credential stuffing) with a second amount of confidence, a third model of the ensemble may predict that the target digital event relates to a third type of fraud (e.g., credential cracking, credential stuffing, or the like) with a third amount of confidence, a fourth model of the ensemble may predict that the target digital event relates to a fourth type of fraud or abuse (e.g., credential cracking) with a fourth amount of confidence, and a fifth model of the ensemble may predict that the target digital event relates to a fifth type of fraud or abuse (e.g., fake user account creation) with a fifth amount of confidence.

In one or more embodiments, if a distinct automated fraud model in the ensemble of predictive automated fraud or abuse models predicts that the target digital event relates to a specific type of fraud or abuse with at least a threshold amount of confidence (e.g., a minimum threat confidence value threshold), S250 may function to label the target digital as relating to that specific type of fraud or abuse. For instance, in a non-limiting example, if a distinct automated fraud model predicted that the target digital event relates to a first type of fraud or abuse with a 5% confidence, that the target digital event relates to a second type of fraud or abuse with a 15% confidence, that the target digital event relates to a third type of fraud or abuse with a 20% confidence, that the target digital event relates to a fourth type of fraud or abuse with a 97% confidence, S250 may function to label that the target digital event relates to the fourth type of fraud (e.g., credential cracking) because the prediction confidence of 97% was above the prediction confidence threshold. Additionally, or alternatively, the ensemble of automated fraud or abuse models may include a plurality of distinct sets of models, where each set of models may be configured for generating an inference for a distinct type of fraud. As a non-limiting example, a distinct set of models may be configured for predicting "credit card fraud". In such example, two or more models together may be implemented to compute a (weighted) inference or the like. It shall be noted that if none of the distinct automated fraud model in the ensemble of predictive automated fraud satisfy the prediction confidence threshold, S250 may optionally function to prompt the subscriber to label the target digital event in similar ways described with respect to S230.

Multi-Headed Automated Fraud or Abuse Classification Model

In one or more embodiments, S250 may function to predict one or more distinct threat classification labels associated with a target digital event via a multi-headed automated fraud or abuse model. The multi-headed automated fraud or abuse model may include a global machine learning model having a plurality of distinct classification heads or layers.

In one or more embodiments, the global machine learning model may function to generate a threat type agnostic automated attack threat score and/or related threat inferences that may be passed, as input, to a group of distinct threat type classification heads. In one or more embodiments, S250 may function to provide the values or attributes of one or more nodes in the reputation graph (described above with respect to S240) to the global machine learning model. For instance, in a non-limiting example, S250 may function to provide, as input, to the global machine learning model one or more count-based attributes, velocity-based attributes, reputation-based attributes, and/or values (e.g., optionally in the form of a corresponding vector value).

In such embodiments, each distinct threat type classification head of the group may be specifically configured and/or designed to generate a threat inference for a distinct digital fraud or digital abuse threat type based at least one the threat inference and/or related threat inference data. In a preferred embodiment, each distinct threat type classification head may function to predict threat classification label corresponding to one distinct digital fraud or abuse threat type. As a non-limiting example, each of the distinct classification heads of the group of distinct classification heads may be able to predict a single fraud or abuse threat type including, but not limited to, one of a "payment abuse", "credit card fraud", "account misappropriation", and/or the like. Additionally, or alternatively, each distinct threat type classification head may function to generate a threat probability and/or threat confidence level in association with the threat classification label.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method of detecting automated online fraud or an online abuse, the method comprising:
   sourcing digital event data associated with one or more activities performed in an online computing environment;
   extracting, by one or more computers, a set of features from the digital event data;
   converting, via an autoencoder model, the set of features to an encoded graphical representation of an activity sequence derived from at least the set of features;
   classifying, by the one or more computers, the encoded graphical representation of the activity sequence to one of a plurality of distinct automated online fraud attacks or online fraud abuses based on an input of data associated with the encoded graphical representation of the activity sequence, wherein the classifying includes:
   searching, via the one or more computers, an automated fraud or abuse signature registry based on the encoded graphical representation of the activity sequence, wherein searching the automated fraud or abuse signature registry includes searching within a plurality of labeled automated fraud or automated abuse clusters for candidate encoded representations of activity sequences that are within a threshold distance of the encoded graphical representation of the activity sequence; and
   selectively implementing one or more automated threat mitigation actions based on the classification of the encoded graphical representation of the activity sequence to the one of the plurality of distinct automated online fraud attacks or online fraud abuses.

2. The method according to claim 1, wherein the converting the set of features to the encoded graphical representation of the activity sequence includes:
   generating a set of vector embeddings based on an input of the set of features extracted from the digital event data;
   computing, by the autoencoder model, the encoded graphical representation of the activity sequence based on an input of the set of vector embeddings of the set of features extracted from the digital event data.

3. The method according to claim 1, wherein the classifying the encoded graphical representation of the activity sequence further includes:
   defining a search query based on the data associated with the encoded graphical representation of the activity sequence;
   executing the search query causing a search of an n-dimensional space that includes a plurality of distinct clusters of encoded graphs, wherein each cluster of the plurality of distinct clusters of encoded graphs is associated with one of the plurality of distinct automated online fraud attacks or online fraud abuses.

4. The method according to claim 3, wherein the classifying the encoded graphical representation of the activity sequence further includes:
   mapping the encoded graphical representation of the activity sequence to one or more of the plurality of distinct clusters of encoded graphs, wherein the mapping includes computing a cosine or a Euclidean distance between vector embeddings associated with the encoded graphical representation and vector embeddings within the n-dimensional space.

5. The method according to claim 4, further comprising:
   identifying one or more vector embeddings of the one or more of the plurality of distinct clusters of encoded graphs that is within a threshold distance of the vector embeddings of the encoded graphical representation of the activity sequence; and
   returning one or more encoded graphs associated with the one or more vector embeddings of the one or more of the plurality of distinct clusters of encoded graphs.

6. The method according to claim 5, wherein the classifying the encoded graphical representation of the activity sequence further includes:
   identifying the classification of the encoded graphical representation of the activity sequence based on classification data associated with each of the one or more encoded graphs returned based on the executed search query.

7. The method of claim 1, wherein:
   the automated fraud or abuse signature registry includes the plurality of labeled automated fraud or automated abuse clusters,
   each of the plurality of labeled automated fraud or automated abuse clusters relates to a distinct type of automated fraud or automated abuse, and
   each of the plurality of labeled automated fraud or automated abuse clusters includes encoded representations of activity sequences associated with the distinct type of automated fraud or automated abuse.

8. The method according claim 1, wherein:
   the digital event data is sourced from activities at a web-enabled service of a subscriber,
   the digital event data is classified to the one of the plurality of distinct automated online fraud attacks or online fraud abuses, and implementing the one or more automated threat mitigation actions includes:
    generating a threat mitigation action that prevents the web-enabled service from processing the digital event data to completion.

9. The method of claim 1, further comprising:
constructing the automated fraud or abuse signature registry, wherein constructing the automated fraud or abuse signature registry includes:
composing a plurality of distinct activity sequences for a plurality of distinct automated fraud or abuse attacks;
computing, via one or more machine learning models, an encoded representation of the plurality of distinct activity sequences;
    implementing one or more unsupervised machine learning models that:
(i) receive model input comprising the plurality of distinct activity sequences, and
(ii) predict a plurality of distinct clusters of activity sequences based on the model input;
assessing the plurality of distinct clusters of activity sequences; and
associating metadata with each of the plurality of distinct clusters based on the assessing, wherein associating metadata with a target cluster of activity sequences includes attributing an automated fraud or abuse attack label to the target cluster.

10. The method of claim 1, further comprising:
executing an automated fraud or automated abuse detection workflow based on identifying the digital event data, wherein:
(a) the automated fraud or automated abuse detection workflow includes a plurality of digital threat mitigation routes, including:
(1) at least one digital threat mitigation route directed to handing the digital event data as a suspected low-throughput, low-volume automated fraud or abuse attack;
(2) at least one digital threat mitigation route directed to handling the digital event data as a high-throughput, high-volume automated fraud or abuse attack; and
(3) at least one digital threat mitigation route directed to handing the digital event data as genuine digital activity, and
(b) the at least one digital threat mitigation route directed to processing the digital event data as the suspected low-throughput, low-volume automated fraud or abuse attack is configured to perform a plurality of automated threat mitigation actions including:
(i) the extracting the set of features from the digital event data;
(ii) deriving the activity sequence associated with the digital event data;
(iii) the converting the set of features to the encoded graphical representation of the activity sequence;
(iv) the classifying the encoded graphical representation of the activity sequence; and
(vi) the selectively implementing the one or more automated threat mitigation actions.

11. The method of claim 10, wherein:
(c) the at least one digital threat mitigation route directed to processing the digital event data as genuine digital activity performs a plurality of automated threat mitigation actions including producing a disposal decision that allows a web-enabled service of a subscriber to process the digital event data to completion, and
(d) the at least one digital threat mitigation route directed to processing the digital event as the high-throughput, high-volume automated fraud or abuse performs a plurality of automated threat mitigation actions including producing a disposal decision that prevents the web-enabled service of the subscriber from processing the digital event data to completion.

12. The method of claim 11, wherein:
extracting the set of features from the digital event data includes:
(I) identifying, via the one or more computers, a digital event data corpus corresponding to a digital event, wherein the digital event data corpus comprises properties or attributes of the digital event data,
(II) computing a plurality of distinct velocity-informative features for at least a subset of the properties or attributes of the digital event data, wherein a velocity-informative feature computed for a subject property or attribute of the digital event data relates to a total number of times the subject property or attribute occurred in digital events detected during a target time span, and
(III) computing a plurality of distinct count-informative features for at least a subset of the properties or attributes of the digital event data, wherein a count-informative feature computed for a subject property or attribute of the digital event data relates to a total number of times the subject property or attribute was detected in other digital events.

13. The method of claim 12, further comprising:
executing a target digital threat mitigation route defined in the automated fraud or automated abuse detection workflow, wherein the target digital threat mitigation route is executed based on identifying that the plurality of distinct velocity-informative features and the plurality of distinct count-informative features satisfy route criteria of the target digital threat mitigation route.

14. The method according to claim 1, wherein
the automated online fraud or the online abuse are executed by malicious bots, and
the malicious bots relate to online activities automated by software causing a divergence from accepted online behavior.

15. A method comprising:
sourcing digital event data associated with one or more activities performed in an online computing environment;
extracting, by one or more computers, a set of features from the digital event data;
computing, by an autoencoder model executed by the one or more computers, an encoded graphical representation of a sequence derived from at least the set of features based on an input of the set of features;
classifying, by the one or more computers, the encoded graphical representation of the sequence to one of a plurality of distinct automated online fraud attacks or online fraud abuses based on an input of data associated with the encoded graphical representation of the sequence, wherein the classifying includes:
searching, via the one or more computers, an automated fraud or abuse signature registry based on the encoded graphical representation of the sequence, wherein searching the automated fraud or abuse signature registry includes searching within a plurality of labeled automated fraud or automated abuse clusters for candidate encoded representations of sequences that are within a threshold distance of the encoded graphical representation of the sequence;
    in response to an input of the encoded graphical representation to a classification model, classifying the encoded graphical representation of the digital event data to the one of the plurality of distinct automated online fraud attacks or online fraud abuses; and selectively implementing one or more automated threat mitigation actions based on the classification of the encoded graphical representation of the sequence to the one of the plurality of distinct automated online fraud attacks or online fraud abuses.

16. The method according to claim 15, wherein the computing the encoded graphical representation of the sequence includes:
generating a set of vector embeddings based on an input of the set of features extracted from the digital event data;
computing, by the autoencoder model, the encoded graphical representation of the sequence based on an input of the set of vector embeddings of the set of features extracted from the digital event data.

17. The method according to claim 15, wherein the classifying the encoded graphical representation of the sequence further includes:
defining a search query based on the data associated with the encoded graphical representation of the sequence;
executing the search query causing a search of an n-dimensional space that includes a plurality of distinct clusters of encoded graphs, wherein each cluster of the plurality of distinct clusters of encoded graphs is associated with one of the plurality of distinct automated online fraud attacks or online fraud abuses.

18. The method of claim 1, wherein:
the automated fraud or abuse signature registry includes the plurality of labeled automated fraud or automated abuse clusters,
each of the plurality of labeled automated fraud or automated abuse clusters relates to a distinct type of automated fraud or automated abuse, and
each of the plurality of labeled automated fraud or automated abuse clusters includes encoded representations of sequences associated with the distinct type of automated fraud or automated abuse.

19. A computer-implemented method of detecting automated online fraud or an online abuse, the method comprising:
sourcing digital event data associated with one or more activities performed in an online computing environment;
extracting, by one or more computers, a set of features from the digital event data;
converting, via an autoencoder model, the set of features to an encoded graphical representation of an activity sequence derived from at least the set of features;
classifying, by the one or more computers, the encoded graphical representation of the activity sequence to one of a plurality of distinct automated online fraud attacks or online fraud abuses based on an input of data associated with the encoded graphical representation of the activity sequence, wherein the classifying the encoded graphical representation of the activity sequence includes:
defining a search query based on the data associated with the encoded graphical representation of the activity sequence, and
executing the search query causing a search of an n-dimensional space that includes a plurality of distinct clusters of encoded graphs, wherein each cluster of the plurality of distinct clusters of encoded graphs is associated with one of the plurality of distinct automated online fraud attacks or online fraud abuses; and
selectively implementing one or more automated threat mitigation actions based on the classification of the encoded graphical representation of the activity sequence to the one of the plurality of distinct automated online fraud attacks or online fraud abuses.

* * * * *